United States Patent [19]
Butler, Jr.

[11] Patent Number: 5,646,345
[45] Date of Patent: Jul. 8, 1997

[54] ACCELERATION RESPONSIVE DEVICE

[75] Inventor: Joseph H. Butler, Jr., Collierville, Tenn.

[73] Assignee: Emhart Inc., Newark, Del.

[21] Appl. No.: 595,118

[22] Filed: Feb. 1, 1996

Related U.S. Application Data

[62] Division of Ser. No. 290,668, Aug. 1, 1994, Pat. No. 5,520,049.

[51] Int. Cl.⁶ ........................................... G01P 15/04
[52] U.S. Cl. ........................................... 73/492; 473/233
[58] Field of Search ............... 473/233; 273/268, 273/29 A, 67 R, 72 R, 73 R; 73/491, 492

[56] References Cited

U.S. PATENT DOCUMENTS

| | | |
|---|---|---|
| 1,712,609 | 5/1929 | Gibson . |
| 2,780,098 | 7/1957 | Maroth . |
| 3,088,321 | 5/1963 | Lathrop ........................... 473/233 |
| 3,589,731 | 6/1971 | Chancellor, Jr. ................. 473/233 |
| 4,470,302 | 9/1984 | Carte . |
| 4,878,672 | 11/1989 | Lukasiewicz . |
| 4,967,596 | 11/1990 | Rilling et al. . |
| 4,991,850 | 2/1991 | Wilhelm . |

*Primary Examiner*—Christine K. Oda
*Attorney, Agent, or Firm*—E. D. Murphy

[57] ABSTRACT

An acceleration responsive device 30 includes a support 34 which supports a rod 46 between two spaced portions of the support. A weighted disc 48 is mounted for movement on the rod and is held by a spring 128 at one end of the rod 46. An indicator 50 is also mounted for movement on the rod 46 adjacent disc 48. A tube 62 is coupled to support 34 to facilitate swinging movement of the device 30 where, due to the acceleration thereof, disc 48 is moved along rod 46 and pushes indicator 50 along the rod. When the swinging movement ceases, disc 48 is returned to the one end of rod 46 and indicator 50 remains at the position to which it was moved. A scale reading of a decal 89 adjacent the moved indicator 50 provides a indication of the acceleration attained during the swinging of device 30. This reading can be applied to a graph to assist the user of device 30 in the selection of golf clubs having a shaft stiffness most appropriate for the user.

12 Claims, 4 Drawing Sheets

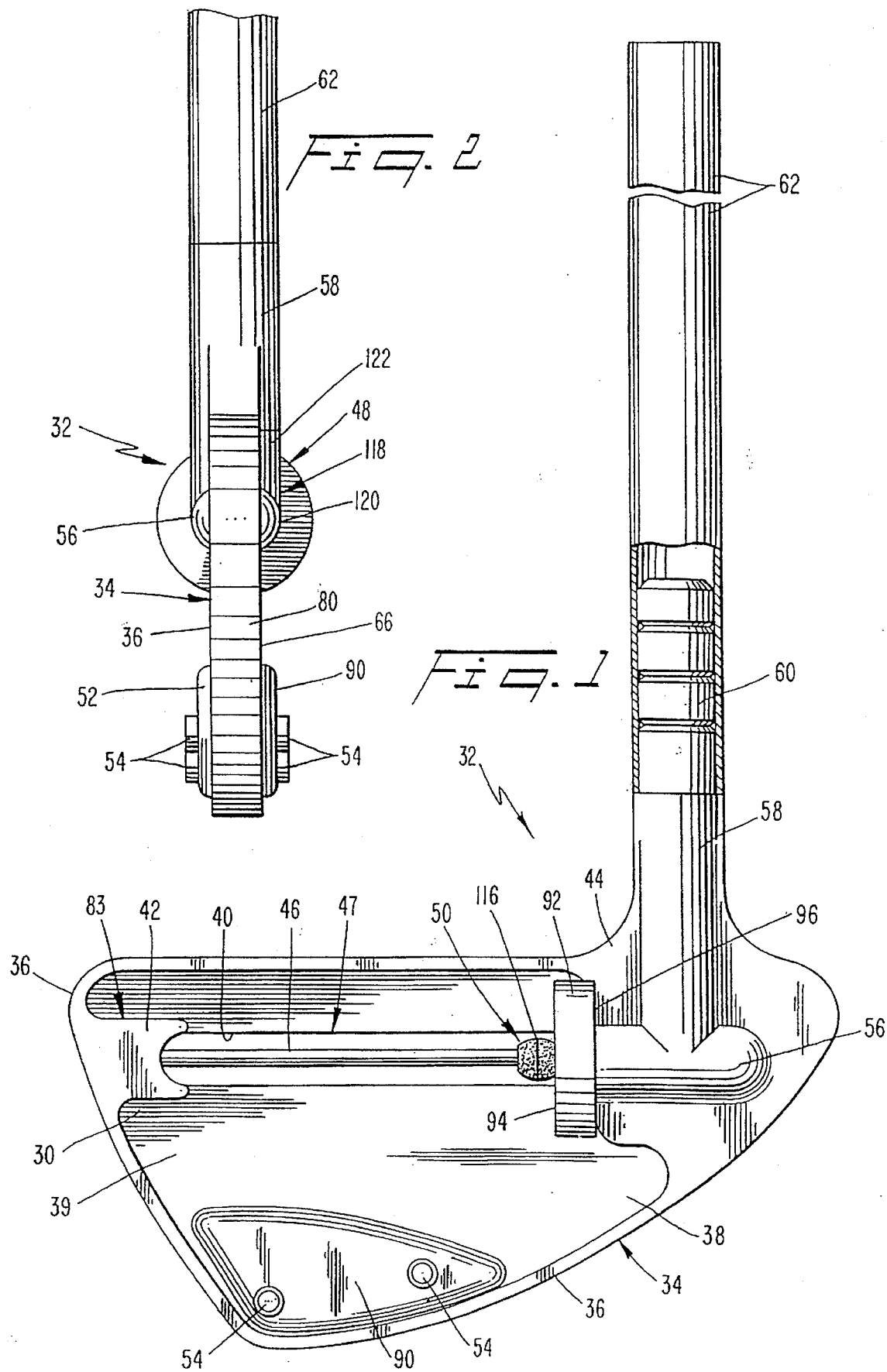

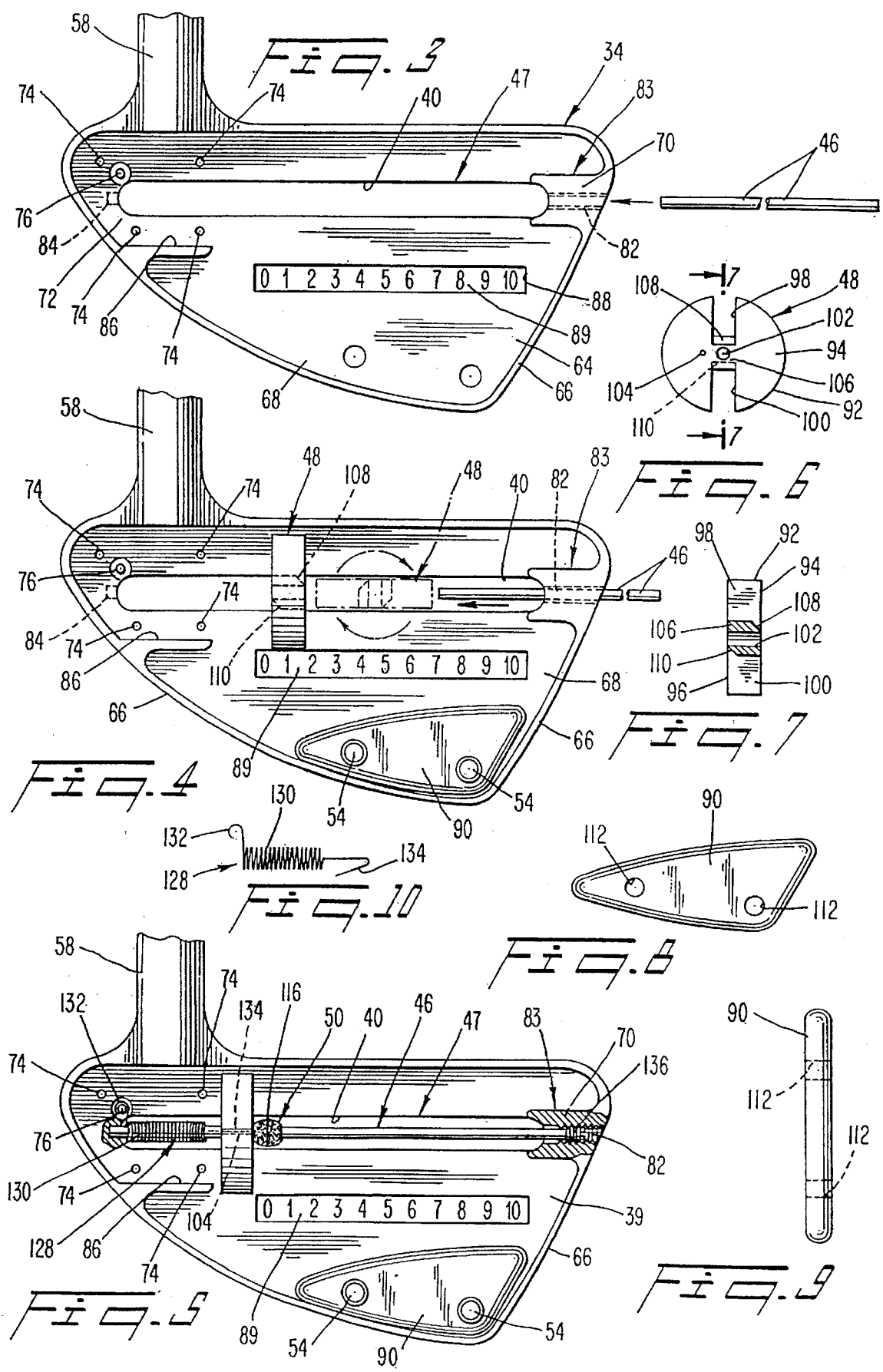

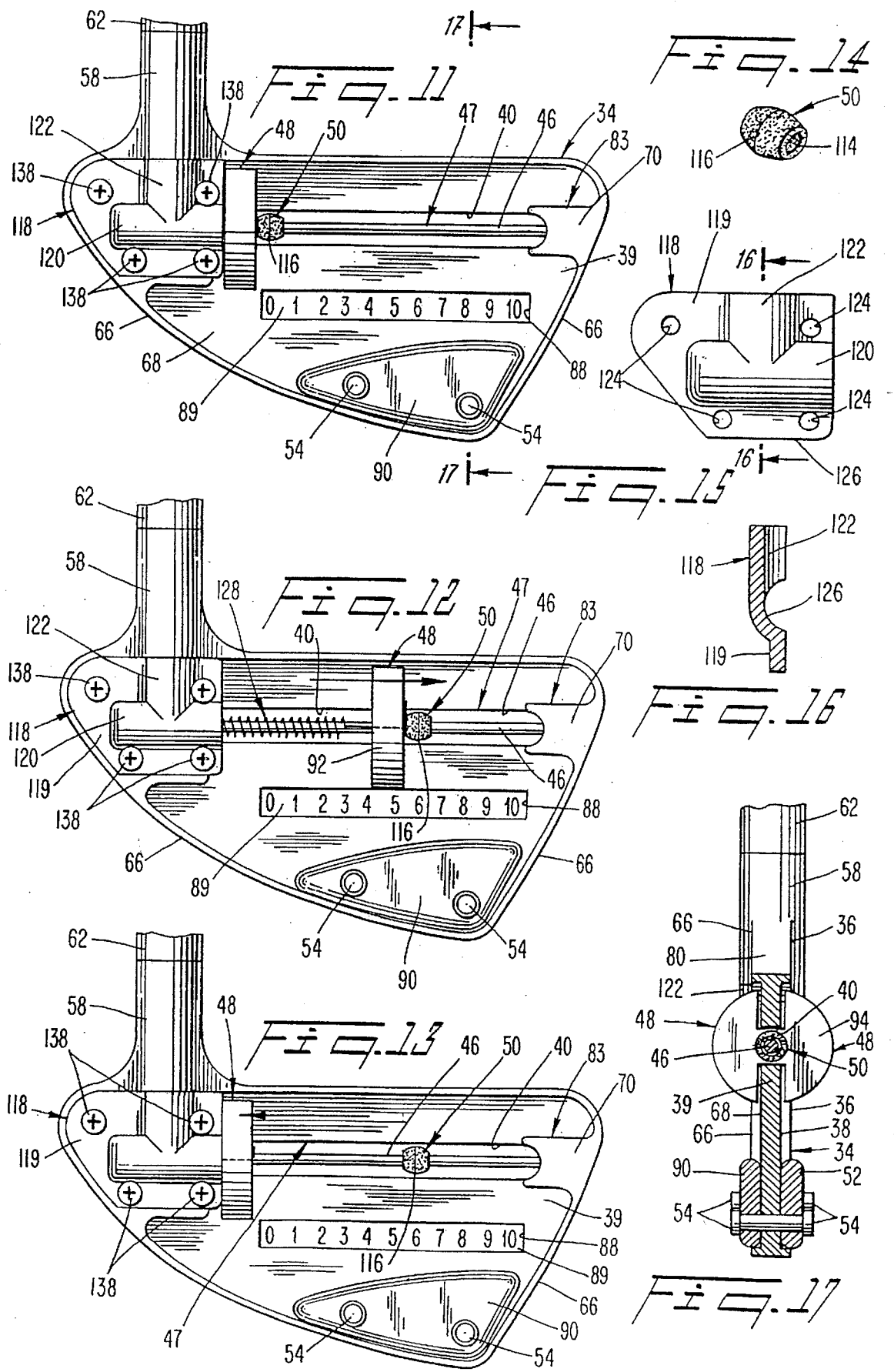

ACCELERATION RESPONSIVE DEVICE

This application is a division of application Ser. No. 08/290,668, filed Aug. 1, 1994, Pat. No. 5,520,049

BACKGROUND OF THE INVENTION

This invention relates to an acceleration responsive device More particularly, this invention relates to a device which, when moved by a user, will register an indication of the acceleration effected during movement of the device.

In the sport of golf, many different structural types of golf clubs are available for a golfer. Each golfer possesses certain physical abilities which are unique to that golfer and, to some extent, are different from other golfers. To accommodate these differences amongst golfers, and to balance these differences amongst the players in the competitiveness of playing golf, golf clubs are manufactured, for example, with different shapes and weights of club heads. In addition, to further accommodate these differences, club shafts are available with different stiffnesses or flexibility.

It is believed that a golfer can enhance the results of the golfer's game by selecting clubs having a shaft stiffness which is most suited for the golfer's particular physical ability to play the game. While this may not insure that the golfer will be a top performer, it does provide the appropriate equipment for the golfer to play the game within the golfer's abilities with less of a concern for having to compensate, during play, for ineffective equipment. This tends to put the pleasure and enjoyment of playing the game, and the competitiveness with other players, at the level of each golfer's abilities rather than a measure of the differences in the quality of the properties of the clubs used by each golfer.

While recognizing that stiffness of the shaft of a golf club is an important factor in a golfer's personalized selection of the equipment to be used, there is a disparity in theories regarding the physical principles to be considered when making such selection. In some instances, it has been the belief that the velocity of the golfer's swing of the club is a major factor to be considered when selecting the stiffness of the club most suited for the golfer. Based on the velocity premise, there is a tendency for some golfers to select shafts which are too stiff. Further, in some cases, the velocity of the club head at the point of impact with the ball can be misleading with respect to club acceleration or "load up" conditions during the downswing. This can lead to an inappropriate selection of shaft stiffness.

It has been determined that the primary structural consideration in selecting the appropriate shaft stiffness for a particular golfer is the amount of "load up" or acceleration applied to the club during the swing, and not the velocity. It has been shown that, as a general rule, the greater the club acceleration ("load up") the greater the golfer's need for a stiffer shaft.

To optimize club/biomechanical performance, the golfer must use a club flex that provides the maximum feedback (flexural deflection) the golfer can control. Since control is related to athletic ability, it is very difficult to define in an engineering sense. Nevertheless, it has been determined that the more acceleration applied to the club during the downswing, the greater the stiffness the average golfer requires to obtain good position repeatability at impact with the ball.

While the foregoing remarks have been made with respect to a golfer regarding the acceleration premise of personalized selection of the shaft stiffness of golf clubs, the principal stated above could be applied to any moving object such as, for example, baseball bats, tennis rackets and the like where the acceleration consideration is significant.

Thus, in view of the importance of the acceleration-related data as noted above, there is a need for a device which will readily provide an indication of the acceleration attained in the moving of the device by an individual who is moving the device. There is also a need to provide methods of using the obtained indications of acceleration to derive critical information leading the individual in the personalized selection of a product which corresponds to the device such as, for example, a golf club.

SUMMARY OF THE INVENTION

In view of the foregoing needs, it is an object of this invention to provide a simple and inexpensive device for obtaining acceleration data related to movement of the device by a user thereof.

Another object of this invention is to provide a device for use by a user to obtain data unique to the user for use in the personalized selection of equipment of a character similar to the device and which is ultimately to be used by the user.

Still another object of this invention is to provide a device which, when used by a user, will provide indication of the attained acceleration during such use unique to the user.

With these and other objects in mind, this invention contemplates an acceleration responsive device which includes a support with a track located on the support and extending between at least a first portion to a second portion of the support. A first member is located on the track in a normal position at a prescribed location of the track adjacent the first portion thereof and has a first side which faces toward the second portion of the support and a second side which faces away from the second portion of the support. A second member is located on the track in a normal position adjacent the first member and has a face which interfaces with the second side of the first member. Each of the first and second members are located on the track for movement relative thereto. A biasing element is attached to the second element for allowing the second member to move along the track and to biasingly return to the normal position thereof. Upon movement of the support in a prescribed manner, and due to the acceleration applied thereto, the second member is caused to move along the track toward the second portion of the support against the biasing action of the biasing member. The second element thereby pushes the first member toward the second portion of the support. After movement of the support ceases, the second member returns under the action of the biasing member to its normal position along the track. The first member remains at its moved position on the track as an indication of the acceleration level attained during the movement of the support.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 1 is a first side of a device used for determining acceleration data in accordance with certain principles of the invention;

FIG. 2 is a rearward end view of the device of FIG. 1;

FIG. 3 is a side view of a support of the device of FIG. 1 revealing a side of the support which, when assembled with other components, forms a second side of the device;

FIG. 4 is a the side view of FIG. 3 showing the manner of assembling other components of the device of FIG. 1 with the support of FIG. 3;

FIG. 5 is the side view of FIG. 3 with parts removed to show components of the device in assembly with the support of FIG. 3;

FIG. 6 is a side view of a weighted disc which is a component of the device of FIG. 1;

FIG. 7 is a sectional view taken along line 7—7 of FIG. 6 Showing certain structural features of the weighted disc;

FIG. 8 is a side view of a weight which is assembled with the support of FIG. 3 to form a component of the device of FIG. 1 in accordance with certain principles of the invention;

FIG. 9 is an end view of the weight of FIG. 8;

FIG. 10 is a side view of an extension spring which is assembled with the support of FIG. 3 and the weighted disc of FIG. 6 in accordance with certain principles of the invention;

FIG. 11 is a complete view of the second side view of the device opposite the first side thereof showing selected components of the device at a first or normal position relative to each other in accordance with certain principles of the invention;

FIG. 12 is another view of the second side of the device showing the selected components thereof having been moved to a second position relative to each other in accordance with certain principles of the invention;

FIG. 13 is still another view of the second side of the device showing the selected components thereof in a third position relative to each other in accordance with certain principles of the invention;

FIG. 15 is a side view of a cover which is assembled with the support of FIG. 3 to conceal and protect certain components of the device of FIG. 1;

FIG. 16 is a sectional view taken along line 16—16 of FIG. 15 showing certain structural features of the cover;

FIG. 17 is a sectional view taken along line 17—17 of FIG. 11 showing an arrangement of certain components in assemble with the support of FIG. 3;

FIG. 18 is a graph which is used in conjunction with the acceleration data obtained by the use of the device of FIG. 1 to assist the user of the device in the personalized selection of a product.

DETAILED DESCRIPTION OF THE PREFERRED EMBODIMENT

Figure 14:
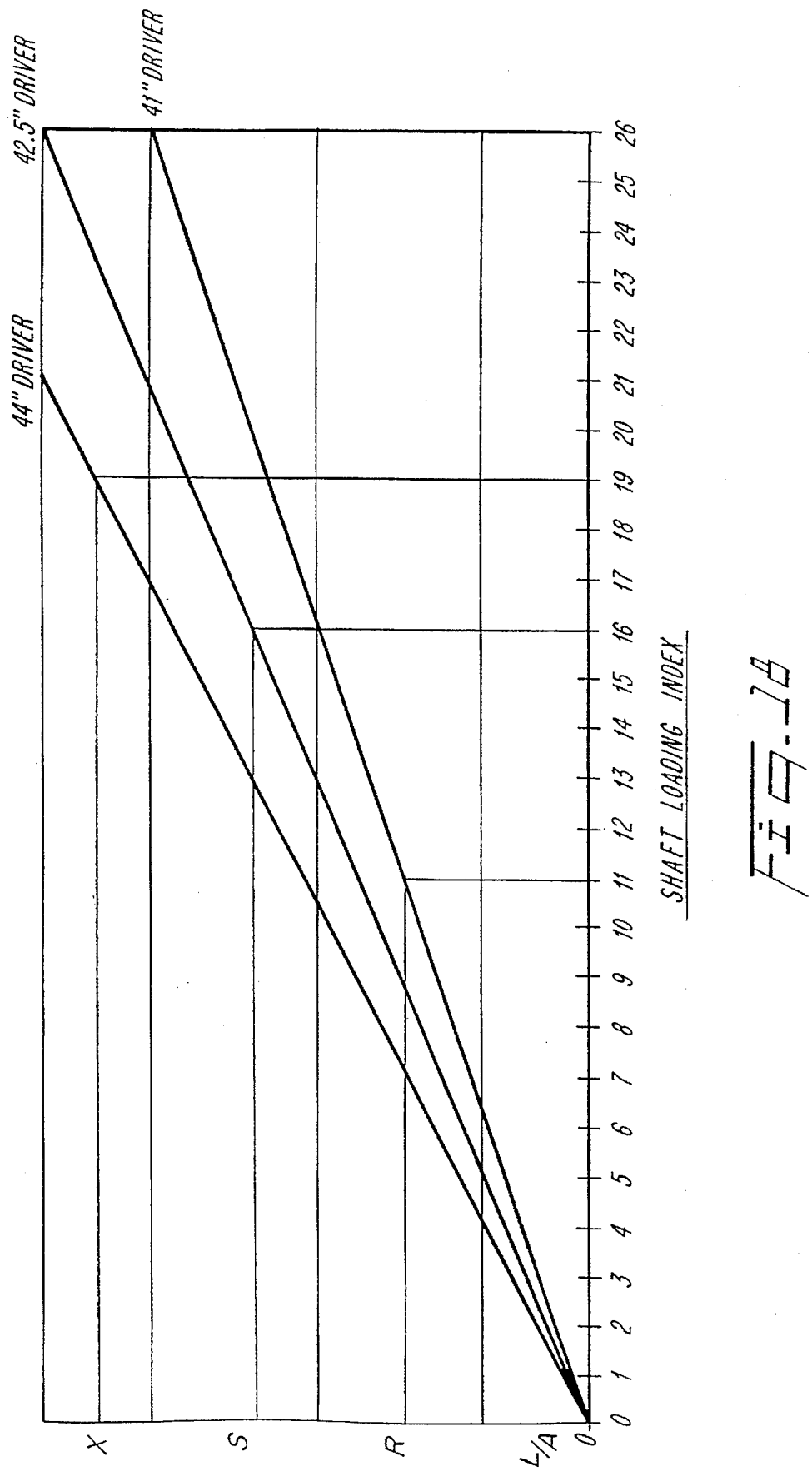
FIG. 14 is a perspective view of an indicator element which is assembled with the support of FIG. 3 to form a component of the device of FIG. 1 in accordance with certain principles of the invention.

Referring to FIG. 1, an acceleration responsive device 30 includes a support 34 having a first side 32 which is formed with an edge ridge 36 essentially surrounding a depressed surface 38 on one side of a body 39 (FIG. 17) of the support. An elongated horizontal slot 40 is formed in an upper portion of the body 39 and extends between an extension 42 of the ridge 36 at the left end of the slot to a housing section 44 of the support 34 at the right end of the slot. A rod 46, which is preferably formed of metal, is located within slot 40 and extends within and between extension 42 and housing section 44 to form a track 47. A disc 48 of a prescribed weight, such as thirty grams, and an indicator 50, composed of a material of relatively light weight, are mounted on rod 46 for movement along track 47. A weight 52 of a prescribed weight is located at the bottom of the support 34 in interfacing engagement with depressed surface 38 and is held in place by a pair of rivets 54.

In the preferred embodiment, disc 48 is composed of cold rolled steel, indicator 50 is composed of a polyurethane foam and weight 52 is composed of lead. Disc 48, indicator 50 and weight 52 could be composed of other suitable materials without departing from the spirit and scope of the invention.

Housing section 44 of support 34 is formed with a horizontal semicircular convex section 56 and a vertical cylindrical section 58 which intersects with section 56 as illustrated in FIG. 1. A lower end of a pin 60 is located within cylindrical section 58 and the upper end of the pin extends upwardly therefrom. One end of a cylindrical tube 62 is located over the upper end of pin 60. Pin 60 is secured to cylindrical section 58 and tube 62 by a friction fit thereof and by an adhesive material. Other suitable means of securance could be employed without departing from the spirit and scope of the invention.

Tube 62 can be any one of several prescribed lengths and serves as a handle or shaft to facilitate use of device 32 in a manner to be described hereinafter.

Referring to FIG. 3, support 34 is formed with a second side 64 similar in structural configuration to first side 32 thereof. In particular, second side 64 is formed with an edge ridge 66 which surrounds a depressed surface 68 thereby forming the other side of body 39 (FIG. 17). In the formation of track 47, slot 40 extends through body 39 of support 34 and longitudinally extends between a ridge extension 70 and a distant horizontally spaced portion 72 of depressed surface 68 which portion defines the inside wall of housing section 44 (FIG. 1). Portion 72 of surface 68 is formed with four threaded holes 74 and a peg 76 extending outwardly therefrom. In addition, a pair of holes 78 are formed through body 39 of support 34 between depressed surfaces 38 and 68 for receipt of rivets 54.

As viewed in FIG. 2, support 34 is formed with a peripheral surface 80 which extends between ridges 36 and 66. Referring again to FIG. 3, a threaded through hole 82 is formed through peripheral surface 80 and an extension 83 formed by ridge extensions 42 and 70 and is positioned for receipt of rod 46. A hole 84 is located in axial alignment with hole 82 at the opposite horizontal end of slot 40 for receipt of one end of rod 46. A ledge 86 is formed by an extension of ridge 66 at the underside of portion 72 of depressed surface 68. A slightly depressed, rectangularly bordered surface 88 is formed in surface 68 below slot 40 for receipt of an adhesive backed decal 89 containing equally spaced numerals "0" through "10" as shown, for example, in FIGS. 11, 12 and 13. In the preferred embodiment, the numerals will extend between "0" and "26" but have been limited in the illustration in the drawings for simplification. It is noted that other techniques for placing the numerals in the location illustrated could be employed without departing from the spirit and scope of the invention.

As shown in FIG. 4, a second weight 90, is mounted at the bottom of body 39 of support 34 in interfacing engagement with depressed surface 68 and is held in place by rivets 54 which also serve to hold weight 52 (FIG. 1) in place. Weight 90 is also preferably formed of lead but could be formed from other materials without departing from the spirit and scope of the invention.

Referring to FIG. 6, disc 48 is circular and is formed with a peripheral surface 92 (FIG. 1) and a pair of spaced flat sides 94 and 96. A pair of radial slots 98 and 100 are formed in disc 48 and extend in opposite directions from locations slightly radially outboard of the axis of the disc and through peripheral surface 92 thereof. A through hole 102 is formed axially through disc 48 and a small hole 104 is formed through the disc at a location slightly offset from the axis thereof and slightly spaced from hole 102. As shown in FIG. 7, a linking web 106 is located at the base of each of the slots 98 and 100. Web 106 is formed with bevelled surfaces 108 and 110 adjacent opposite sides of disc 48.

Referring to FIGS. 8 and 9, weight 90 (FIG. 1) is shaped generally in a triangular configuration and is formed with two through holes 112 to facilitate receipt of rivets 54. Weight 52 is essentially of the same configuration as weight 90. In the preferred embodiment, each of the weights 52 and 90 weigh forty-five grams.

As shown in FIG. 14, indicator 50 is shaped similar to a football and has an axial hole 114 formed therethrough. Also, an indicator line 116 is formed on an intermediate portion of the exterior of indicator 50.

Referring to FIGS. 15 and 16, a cover 118 is formed with a flat surface 119. A horizontal half-cylindrical channel 120 extends from flat surface 119 which intersects with a vertical half-cylindrical channel 122 which also extends from the flat surface. Cover 118 is also formed with four through holes 124 and with a perimeter outline 126 for locating the cover within a space above ledge 86 (FIG. 3) of support 34 to serve as a closure for housing section 44 on the second side 64 of the support.

As shown in FIG. 10, an extension spring 128 is formed with an intermediate coiled section 130 with a hook 132 formed at one end thereof and a jogged section 134 at the other end thereof.

Referring to FIG. 4, in assembling the various components of device 32, disc 48 is oriented so that the flat sides 94 and 96 are in a horizontal orientation as shown in phantom and the disc is aligned with the horizontal disposition of slot 40. Disc 48 is then moved laterally into slot 40 in the position shown in phantom and slots 98 and 100 of the disc are aligned with and are in the orientation of the top and bottom of slot 40. Thereafter, disc 48 is revolved ninety degrees in a clockwise direction as indicated by the curving arrows above and below the phantom illustration of the disc. By maneuvering disc 48 in this manner, the disc eventually attains a vertical orientation as shown in solid lines in FIG. 4 whereby the slots 98 and 100 of the disc straddle adjacent portions of body 39 of support 34. During the movement of disc 48 in the clockwise direction, bevelled surfaces 108 and 110 provide clearance between the portions of body 39 at the top and bottom of slot 40 and the web 106 of the disc to ease the repositioning of the disc from the horizontal position to the vertical position.

After the disc 48 has been moved to the vertical position, rod 46 is moved into threaded hole 82 and partially into slot 40 of support 34. Hole 114 of indicator 50 is then positioned over the end of rod 46 which is located in slot 40 whereafter the same end of the rod is moved through axial hole 102 of disc 48, through coiled section 130 of spring 128 and eventually into hole 84 formed in support 34 at the left end of slot 40. This completes the formation of track 47 with the assembled disc 48 and indicator 50.

As shown in FIG. 5, a set screw 136 is threadedly mounted into threaded hole 82 of support 34 to retain rod 46 in the assembled position as described above. Jogged section 134 of spring 128 is positioned through the small hole 104 formed through disc 48 from side 96 thereof and extends beyond the other side 94 thereof where the jogged section is bent to retain the jogged section with the disc. Hook 132 of spring 128 is positioned over peg 76 located in housing section 44 of support 34. Thereafter, cover 118 is positioned in the space above ledge 86 of support 34 so that holes 124 of the cover align with threaded holes 74 of the support. Threaded fasteners 138 (FIGS. 11, 12 and 13) are then used to secure cover 118 with support 34 to thereby conceal and protect spring 128 and insure that hook 132 is retained on peg 76.

Golfers typically use drivers which are forty inches to forty-five inches in length depending on the physical needs of the particular golfer. In order to accommodate a golfers requirements in use of device 30, and to make the device universal, a single length of forty-one and one-half inches is used for tube 62, and a club length of forty-three inches, in the preferred embodiment. However, without departing from the spirit and scope of the invention, one inch gradients could be placed at the top of tube 62 (FIG. 1) to indicate the location to be gripped by each user of the device for the length of club best suited for that user. This selection would be consistent with the length of driver normally used by the user of device 30 when playing golf. Other techniques could be employed without departing from the spirit and scope of the invention. For example, tubes 62 of different lengths could be used in place of the tube of single length used in the preferred embodiment.

Also, in use of device 30, the device should approximate the weight of the driver that would be used by the golfer who is using the device. This weight consideration simulates the swinging of a driver which is closely related to the weight considerations inherent in the driver actually used by the golfer when playing golf. After analysis of the actual weight of a traditional driver, and taking into consideration the "swing weight" of the same traditional driver, the preferred weight selected for each of the weights 52 and 90 is forty-five grams. The "swing weight" principle is a universal methodology used to match a set of clubs and is a measure of each club's "weight distribution" during the swinging motion of the club. While this weight of forty-five grams is the preferred weight, other weights could be selected without departing from the spirit and scope of the invention. Also, weights 52 and 90 could be mounted removably on support 34 and different weights could be used for different users of the device.

Referring to FIG. 18, a graph is shown which is used in conjunction with the use of the device 30 to assist a golfer in selecting a golf club such as, for example, a driver with a shaft stiffness, or Shaft Loading Index, best suited for the golfer's physical abilities. The abscissa of the graph is marked with gradients "0" through "26" representing the markings of the scale of decal 89 (FIGS. 11, 12 and 13). The ordinate of the graph is marked with shaft stiffness indicators L/A, R, S and X each of which represents a shaft stiffness different from the stiffness associated each of the other indicators. L/A represents the lowest shaft stiffness and X represents the highest shaft stiffness. Each of the shaft stiffness indicators presents a single stiffness selection for a range of shaft loading indices in conjunction with the length of golf club typically used by the golfer who is using device 30. The manner of using device 30 and the graph of FIG. 18 with respect to the length of the club typically used by the golfer is explained in detail hereinbelow.

In preparing the graph, actual golf clubs such as, for example, woods of various known stiffnesses were used by a large number of golfers and strain gages were placed on the clubs during use to determine the bending of the shafts of the clubs as the golfers swung the clubs. The length of the shaft of the club used by each golfer was the length best suited for that golfer. While six shaft lengths of forty, forty-one, forty-two, forth-three, forty-four and forty-five inches were used during the preparation of the graph, the data derived thereby was simplified and compressed to three lengths for plotting on the graph. For example, all data derived from the use of shaft lengths of forty and forty-one inches was plotted as forty-one inches, all data derived from the use of shaft lengths of forty-two and forty-three inches was plotted as forty-two and one-half inches and all data derived from the use of shaft lengths of forty-four and forty-five inches was plotted as forty-four inches. Information derived from this testing provided a personal feedback or successful "feel" reaction by each golfer to the stiffness of the shafts being used and allowed the golfer to indicate the stiffness for which that particular golfer was most suited. Each of the same golfers used device 30 to correlate the successful "feel" of the actual club previously used by each golfer in relation to the numerical readings on the scale of decal 89. These numerical readings were compressed as noted above and plotted on the graph to arrive at the three plotted lines shown on the graph with each line being dedicated to a particular one of the three different club lengths of forty-one, forty-two and one-half and forty-four inches.

In use of device 30, a user will grip tube 62 at the top thereof as viewed in FIG. 1 and will thereafter swing the device in the manner of swinging a conventional golf club. As device 30 is swung, disc 48 is moved, in response to the acceleration of the swinging of the device, from a home or rest position and along rod 46 and track 47 against the biasing action of spring 128. As disc 48 is moved, the disc pushes indicator 50 from a home or rest position along rod 46 and track 47. Upon completion of the swinging of device 30 by the user, disc 48 is returned to its home position on rod 46 and track 47 by the biasing action of spring 128. However, indicator 50 remains at the position on rod 46 and track 47 to which it was pushed by disc 48 whereby indicator line 116 is aligned with one of the numerals on decal 89 to indicate the acceleration level attained during the swinging of the device. The numeral so attained is recorded. Indicator 50 is then returned manually to its home position on rod 46 and track 47 and the same process is repeated several times such as, for example, ten times. The average of the several readings is then computed as an average acceleration reading as a measure of the acceleration attained by the swinging of device 30.

The average acceleration reading is then applied to the abscissa of the graph. A vertical line is drawn from the average reading on the abscissa to an intersection with the appropriate club-length line previously plotted on the graph. A horizontal line is then drawn from the intersection with the club-length line to the ordinate to provide a reading representing appropriate club stiffness for the user of device 30. The user of device 30 can now proceed to obtain golf clubs, having a shaft stiffness best suited for the golfer, on the basis of the data derived from the use of device 30.

It is noted that, without departing from the spirit and scope of the invention, the premise of device 30 could be used in the personalized selection of other types of sport and non-sport implements such as, for example, baseball bats, tennis rackets and the like where the use of such implements are based on the acceleration responsive parameter.

Further, while the foregoing example of the use of device 30 is described with respect to wood clubs, the device could be used in the personalized selection of other types of golf clubs.

In general, the above-identified embodiments are not to be construed as limiting the breadth of the present invention. Modifications, and other alternative constructions, will be apparent which are within the spirit and scope of the invention as defined in the appended claims.

What is claimed is:

1. An acceleration responsive device, which comprises: a support, a handle attached to the support, a track located on the support extending between at least a first portion to a second portion of the support and located at an angle with respect to the handle, a first member located on the track in a normal position at a prescribed location of the track adjacent the first portion of the support and having a first side which faces toward the second portion of the support and a second side which faces away from the second portion of the support, a second member located on the track in a normal position adjacent the first member and having a face which interfaces with the second side of the first member, each of the first and second members being located on the track for movement relative thereto, a biasing element attached to the second member for allowing the second member to move along the track and to biasingly return to the normal position thereof, whereby, upon movement of the support in a prescribed manner, and due to the acceleration applied thereto, the second member is caused to move along the track toward the second portion of the support against the biasing action of the biasing element to push the first member toward the second portion of the support where, after reaching the maximum acceleration during the movement, the second member returns under the action of the biasing element to the normal position of the second member and the first member remains at its moved position on the track as an indication of the acceleration of the support during the movement thereof.

2. An acceleration responsive device, which comprises: a support, a handle attached to the support, a track formed in the support and extending from a first portion of the support to a spaced second portion thereof and located at an angle with respect to the handle, an acceleration responsive element located at a first end of the track in a rest position and mounted for movement on the track, a movable element located on the track in a rest position adjacent the acceleration responsive element and between the acceleration responsive element and a second end of the track spaced from the first end thereof, the movable element mounted on the track for movement relative thereto, and a biasing element coupled between the support and the acceleration responsive element to normally urge the acceleration responsive element toward the first end of the track.

3. The acceleration responsive device as set forth in claim 2, wherein the support includes a body of a prescribed configuration, a housing section and a cover for attachment to the housing section.

4. The acceleration responsive device as set forth in claim 2, wherein the support includes a body having an elongated slot formed therethrough, and a rod mounted in and extending from one end of the elongated slot to an opposite end thereof, whereby the slot and rod form the track.

5. The acceleration responsive device as set forth in claim 2, wherein the acceleration responsive element is of a prescribed shape formed with a pair of slots extending outwardly to and through a periphery of the element.

6. The acceleration responsive device as set forth in claim 2, wherein the biasing member is a spring.

7. The acceleration responsive device as set forth in claim 2, which further comprises at least one weight of a prescribed weight attached to the support.

8. The acceleration responsive device as set forth in claim 2, which further comprises a scale of characters appearing on the support adjacent the track to provide an indication of the location of the movable element following accelerating movement of the support.

9. The acceleration responsive device as set forth in claim 2, which further comprises a tube coupled to the support to provide the handle for the device and facilitate swinging movement of the support by a user of the device.

10. The acceleration responsive device as set forth in claim 4, wherein the elongated slot is defined by spaced opposed edges of the body extending between the first portion and the second portion of the support.

11. The acceleration responsive device as set forth in claim 5, wherein the pair of slots of the acceleration responsive element are each formed with a base and one end portion of each base which is formed with a bevelled surface.

12. The acceleration responsive device as set forth in claim 3, wherein the biasing element is located in the housing section and the cover is located over the housing section to conceal the biasing element.

* * * * *